United States Patent [19]

German, Jr. et al.

[11] 4,337,069

[45] Jun. 29, 1982

[54] GAS PHASE OLEFIN POLYMERIZATION RECYCLE GAS SCRUBBING TOWER

[75] Inventors: Paul M. German, Jr., Friendswood; James A. Lamont, Alvin, both of Tex.; John C. Gee, Oswego, Ill.

[73] Assignee: Standard Oil Company (Indiana), Chicago, Ill.

[21] Appl. No.: 143,535

[22] Filed: Apr. 25, 1980

[51] Int. Cl.³ .................... B01D 53/00; B01D 57/00; B01F 3/08

[52] U.S. Cl. ........................................ 55/229; 55/355; 261/110; 422/131; 422/234; 422/230; 366/137

[58] Field of Search ............... 422/131, 230, 231, 233, 422/234, 138; 239/318; 261/36 R, 110; 55/229, 355; 417/116; 60/696; 261/123 R; 366/137, 173, 174

[56] References Cited

U.S. PATENT DOCUMENTS

| | | | |
|---|---|---|---|
| 3,028,227 | 4/1962 | Ballestra | 422/234 |
| 3,626,672 | 12/1971 | Burbidge | 261/36 R |
| 3,648,440 | 3/1972 | Egan | 261/36 R |
| 4,164,541 | 8/1979 | Platz | 422/230 |

OTHER PUBLICATIONS

Vortex Formation in Stirred Draining Vessels, Hayduk et al., Can. J. of Chem. Eng., vol. 56, Oct. 1978, pp. 544–549.

*Primary Examiner*—Michael S. Marcus
*Attorney, Agent, or Firm*—Wallace L. Oliver; William T. McClain; William H. Magidson

[57] ABSTRACT

In an apparatus, such as a liquid-gas condensation tower, in which a liquid phase is withdrawn rapidly through an exit port from a chamber, an improvement which assures complete agitation throughout the liquid phase comprises a regular array of liquid agitation devices positioned within the liquid and above a cone-shaped vortex breaker structure which is placed above the exit port.

3 Claims, 4 Drawing Figures

4,337,069

GAS PHASE OLEFIN POLYMERIZATION RECYCLE GAS SCRUBBING TOWER

BACKGROUND OF THE INVENTION

This invention relates to an improved liquid-gas condensation tower and particularly relates to a recycle gas scrubbing tower useful in a gas phase olefin polymerization system.

A conventional recycle gas scrubber used in a gas phase olefin polymerization system such as used in U.S. Pat. No. 3,971,768, incorporated herein by reference, comprises a condensation tower designed to separate quench liquid, monomer, hydrogen and polymer fines. A typical tower comprises a vertical cylindrical chamber in which unseparated off-gas material from a gas-phase olefin polymerization reactor is introduced, and condensor trays positioned at various heights along the chamber. Gaseous material is removed from the upper portion of the tower while residual liquid material, including polymer fines, is removed from the bottom of the tower. It has been observed that in using a conventional scrubber apparatus in a gas phase olefin polymerization system, lumps of polymer formed in the condensation tower and caused fouling and pluggage in downstream equipment. An improved scrubber apparatus which avoids formation of polymer lumps would prevent many unplanned unit shutdowns.

SUMMARY OF THE INVENTION

In an apparatus, such as a liquid-gas condensation tower, in which a liquid phase is withdrawn rapidly through an exit port from a chamber, an improvement which assures complete agitation throughout the liquid phase comprises an array of liquid agitation devices positioned within the liquid and above a cone-shaped vortex breaker structure which is placed above the exit port.

BRIEF DESCRIPTION OF THE DRAWINGS

FIG. 4 shows an eductor useful in this invention.

BRIEF DESCRIPTION OF THE INVENTION

Figure 1:
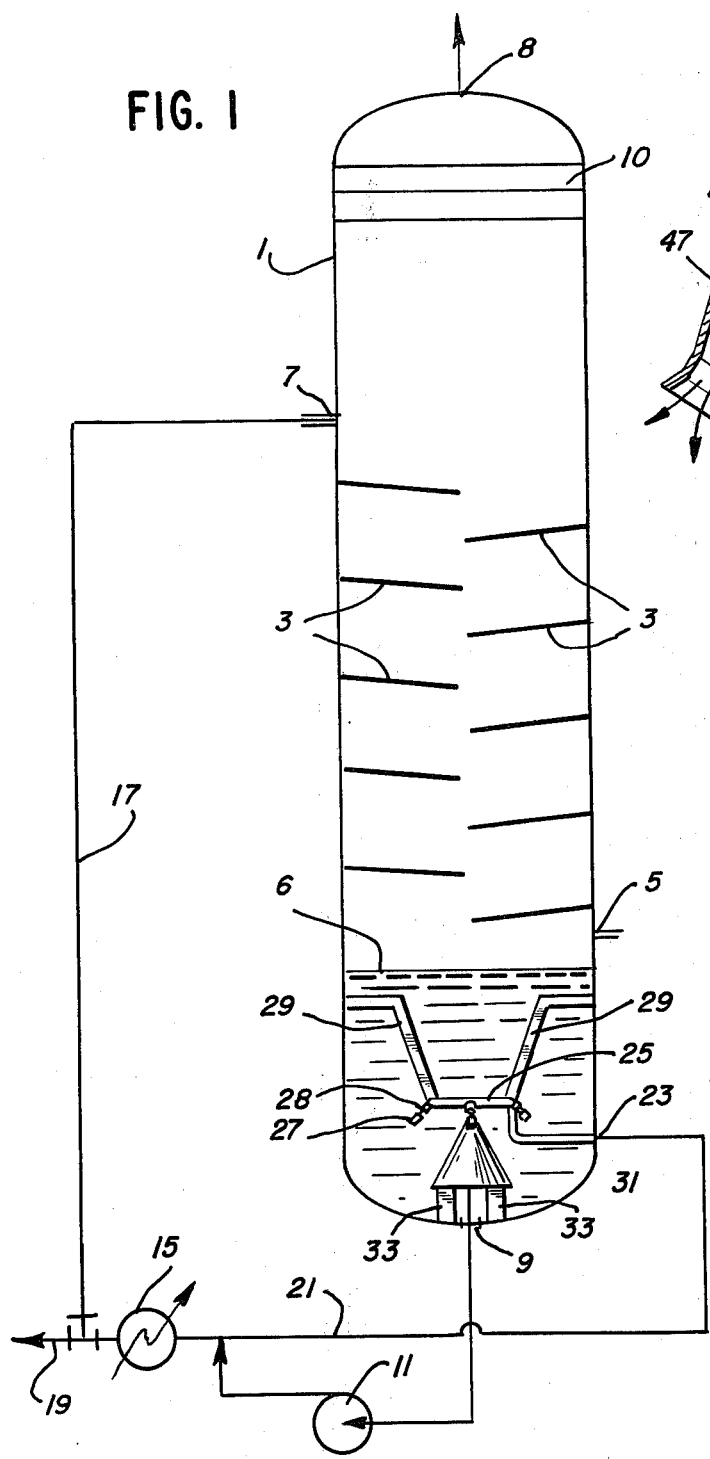
FIG. 1 is a view of a condensation tower system showing the apparatus of this invention.
Figure 2:
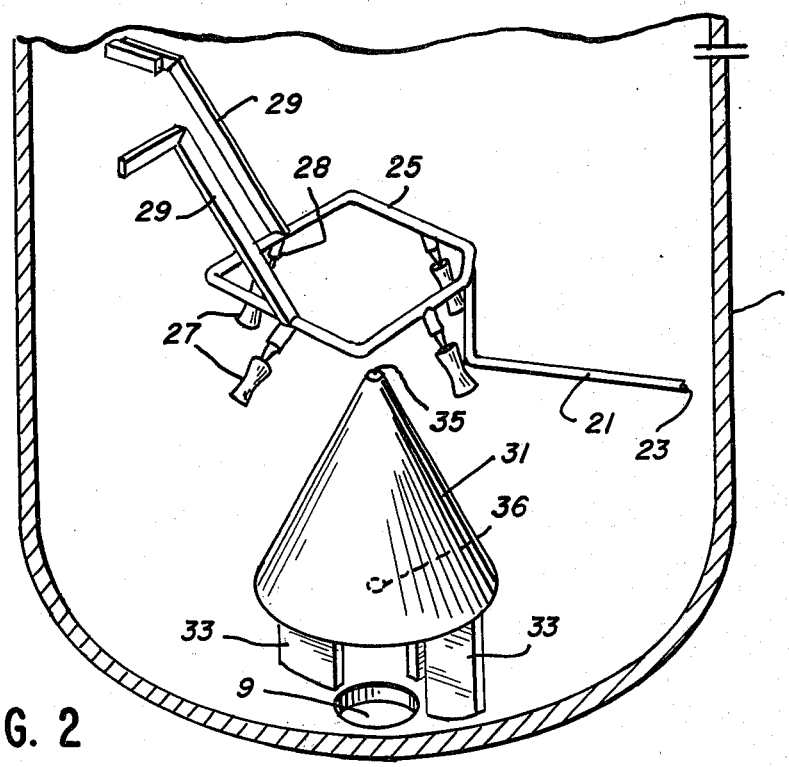
FIG. 2 shows in more detail a side view of the vortex breaker and eductor array of this invention.
Figure 3:
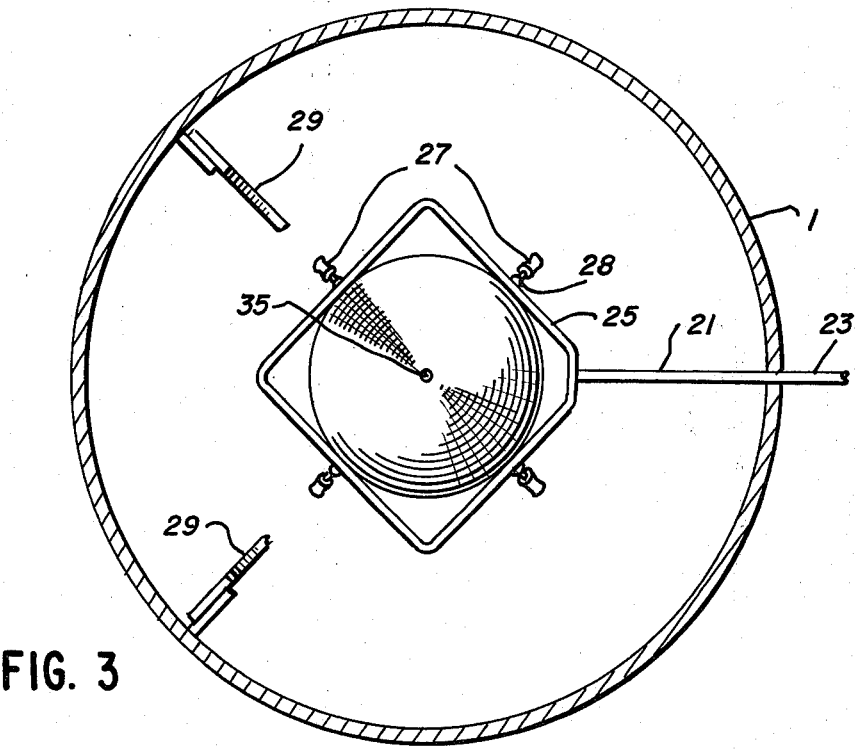
FIG. 3 is a top view of the vortex breaker and eductor array of this invention.

The invention described herein is an apparatus useful in separating components of off-gas from a gas phase olefin polymerization system. Such apparatus of this invention, commonly called a recycle scrubbing tower, comprises a condensation tower designed to separate reactor off-gas components in which is positioned a cone-shaped vortex breaker and a series of liquid mixing devices. In this invention the cone-shaped vortex breaker is placed in the bottom of the condensation unit to prevent vortex formation, prevent active polyolefin powder accumulation, and improve liquid flow patterns in the bottom of the tower. Mixing devices, such as mixing eductors, are placed below the normal liquid level in the tower, cooperatively positioned above the cone-shaped vortex breaker and oriented such that liquid circulation prevents polyolefin accumulation. The action of the mixing devices together with the cone-shaped vortex breaker is to reduce static areas in the tower where polymer accumulations may form.

In greater detail the vortex breaker used in this invention is a cone-shaped structure typically attached to the bottom of the tower. By the term "cone-shaped" we mean a geometric structure with a round or multi-sided base tapering upward to a peak. The top of the structure typically contains a purge hole so that the "cone-shaped" structure appears slightly truncated. Purge holes usually are placed at the top and bottom of the structure for pressure equalization to maintain structural integrity of the cone-shaped device. However, the structure should not have any substantial horizontal areas where polymer powder could accumulate. A pyramidal structure with a base other than a circle, ellipse or the like is considered within our invention.

The mixing devices useful in this invention are capable of moving liquid in the tower bottom such that accumulation of polymer powder is prevented. The preferred mixing device is a mixing eductor in which liquid under pressure is passed through a nozzle which entrains liquid from the tower bottom and discharges the mixed liquids from the eductor. Such devices are especially suitable for mixing liquids containing powdered solids.

Gas phase reactor systems in which this invention is useful include both stirred bed reactors and fluidized bed reactor systems. Examples of such reactor systems are described in U.S. Pat. Nos. 3,957,448, 3,965,083, 3,971,768, 3,970,611, 4,129,701, 4,101,289, 3,652,527, and 4,003,712, all incorporated by reference herein.

The gas phase olefin polymerization reactor systems in which the present invention is useful comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel.

A quench liquid can be added to polymerizing olefin in order to control temperature. In propylene polymerization, the quench liquid can be liquid propylene. In other olefin polymerization reactions, quench liquid can be a liquid hydrocarbon such as propane, butane, pentane or hexane, preferably, isobutane or isopentane. Depending on the specific reactor system used, quench liquid can be injected into the reactor vessel above or within the bed of polymer particles.

The polyolefins produced in a gas phase olefin polymerization system using this invention include polymers of alpha-olefins and substituted alpha-olefins, ethylene polymer, propylene polymer, copolymers of ethylene and propylene, and copolymers of ethylene or propylene with other copolymerizable alpha-olefins. Many such polyolefins typically are prepared by contacting an olefin monomer with a catalyst comprising an organoaluminum compound and a transition metal compound.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytically effective amounts of mixtures of trialkylaluminum and dialkylaluminum halides can be used in conjunction with alkylaluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable in propylene polymerizations. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used for propylene polymerizations. Titanium trichloride can be activated to a high degree of polymerization activity by chemical and physical means. One activated titanium trichloride has an approximate stoichiometric formula of $TiCl_3 \cdot \frac{1}{3}AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

Other suitable transition metal compounds are halides, oxyhalides, alkyloxyhalides, aryloxyhalides, alkoxides, or aryloxides of a Group IVB or VB transition metal, preferably vanadium or zirconium, and most preferably titanium. Preferable compounds for ethylene polymerization include titanium tetrachloride, titanium tetrabromide, butoxytitanium trichloride, dibutoxytitanium dichloride, tetrabutyl titanate, vanadium tetrachloride and zirconium tetrachloride. Also useful are supported and unsupported Group VIB oxides, such as chromia or chromia on alumina.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Catalyst additives can be added in minor amounts such as disclosed in U.S. Pat. Nos. 3,950,268 and 4,072,809 incorporated herein by reference.

In gas-phase olefin polymerization systems useful in this invention, typically off-gas leaving the polymerization reactor, together with some entrained polymer fines, are fed to a recycle scrubber tower. Contact with circulating quench liquid, or liquid monomer, partially condense the reactor off-gas. After condensate is circulated and cooled, it can be returned to the upper portion of the scrubber or returned to the reactor as quench liquid. Overhead gas from the scrubber tower can be separated further and can be compressed for return to the reactors in a regulated stream. Such recycle scrubber typically is a high flow unit in which substantial quantities of off-gas and condensate are circulated. Condensate rapidly leaving the scrubber through an exit port positioned in the bottom of the scrubber tower may form a vortex which will create accumulations of polymer fines in areas of the tower with inadequate agitation. It was found that baffles placed in the tower bottom as vortex breakers did not prevent polymer accumulations.

The cone-shaped vortex breaker described in this invention is placed above the liquid exit port located in the lower portion of a gas-liquid condensation tower. The base of the cone-shaped structure should be at least as large as the liquid exit port and preferably the diameter or width of the base is fifty to one hundred percent larger than the exit port. The slope angle of the cone-shaped structure should be steep enough such that solids will not accumulate on its surface. A 60° cone is found adequate. Typically the vortex breaker is supported by legs attached to the tower bottom.

Above and in proximity to the cone-shaped vortex breaker and below the minimum liquid level in the condensor tower is placed a regular array of mixing devices, the effluent of which is directed generally downward such that areas of inadequate circulation in the bottom of the tower are avoided. The downward angle between the effluent direction and a horizontal plane can be about 0° to about 90°, preferably is about 20° to about 60°, and most preferably about 45°. Any number of mixing devices, preferably eductors, can be spaced in a regular array such that no liquid volume in the tower bottom is not sufficiently agitated. Four to six eductors are adequate. The amount of liquid ejected by the eductors should be sufficient for adequate circulation. It is found that circulation to the eductors of about 15% of the total circulation of liquid through the condensor system is adequate for proper agitation. A typical eductor useful in this invention entrains about three liters of suction liquid for each liter of pressure liquid passed through it.

The eductor array typically is connected to a liquid supply manifold which is secured above the vortex breaker by struts attached to the tower sides or legs attached to the tower bottom.

The vortex breaker described in this invention is placed at a distance above the exit port such that liquid can readily flow around the vortex breaker and into the exit port but not so high as to permit a vortex to form. Typically the height of the vortex breaker structure above the exit port is about 0.5 to about 1.5, preferably about 0.75 to about 1.0, times the diameter of the exit port. The eductor array is placed above the vortex breaker structure at a distance such that substantially complete agitation of the tower bottom is achieved.

The condensation liquid circulation system described herein is equipped with suitable valves and flow controllers designed to regulate circulation as required by process conditions.

Our invention is illustrated by reference to the drawings. Within condensation vessel 1 are placed a series of condensor trays 3 which typically are semicircular plates positioned at about a 5°-angle downward from horizontal and preferably have a slot or hole in the rear section of the tray to aid circulation of fluid. Condensation liquid is injected through port 7 and partially condenses vapor containing a condensable vapor which enters through port 5 above liquid level 6. Uncondensed gas exits through port 8 after passing through demister pad 10 designed to prevent solids carryover. Liquid leaves the vessel through exit port 9 and is recirculated by pump 11 through line 13. A portion of the liquid is cooled in heat exchanger unit 15 and recirculated to the condensor vessel by line 17. A portion of the liquid is taken by line 19 to a reactor vessel. A portion of the recirculated liquid is transferred by line 21 through port 23 to a manifold 25 feeding an array of eductors 27 through pipe stems 28. Said manifold and eductor array supported by struts 29 are situated above a cone-shaped structure 31 supported by legs 33. The cone-shaped structure 31 contains a top purge hole 35 and a bottom purge hole 36.

Eductor 27 contains a pressure liquid port 41 and nozzle 43 through which pressure liquid is ejected and mixes in chamber 45 with suction liquid entering through ports 47. Mixed liquid is ejected through mouth 49.

We claim:

1. In an apparatus in which a liquid phase is withdrawn rapidly through an exit port from a chamber comprising a chamber and an exit port located in the bottom portion of such chamber, the improvement comprising (a) an array of eductors through which liquid is passed and (b) a cone-shaped structure, the base of which is at least as large as the exit port and placed above the exit port such that the distance between the exit port and the base of such structure is about 0.5 to about 1.5 times the diameter of the exit port; wherein the array of eductors is positioned above and in proximity to the cone-shaped structure and below a predetermined height below which liquid normally is present and liquid flow from said eductors is directed downward such that said flow cooperates with said cone-shaped structure to create complete agitation of said liquid around said cone-shaped structure.

2. In a condensation tower comprising a tower equipped with a liquid circulation system, condensable vapor input port and liquid condensate exit port located in the bottom portion of such tower, the improvement comprising (a) an array of eductors through which liquid is passed and (b) a cone-shaped structure, the base of which is at least as large as the exit port and placed above the exit port such that the distance between the exit port and the base of such structure is about 0.5 to about 1.5 times the diameter of the exit port; wherein the array of eductors is positioned above and in proximity to the cone-shaped structure and below a predetermined height below which liquid normally is present and liquid flow from said eductors is directed downward such that said flow cooperates with said cone-shaped structure to create complete agitation of said liquid around said cone-shaped structure.

3. In a gas phase olefin polymerization off-gas recycle scrubber tower comprising a condensation tower equipped with a condensation liquid circulation system, a condensable vapor input port and a liquid condensate exit port located in the bottom portion of such tower, the improvement comprising (a) an array of eductors through which liquid is passed and (b) a cone-shaped structure, the base of which is at least as large as the exit port and placed above the exit port such that the distance between the exit port and the base of such structure is about 0.5 to about 1.5 times the diameter of the exit port; wherein the array of eductors is positioned above and in proximity to the cone-shaped structure and below a predetermined height below which liquid normally is present and liquid flow from said eductors is directed downward such that said flow cooperates with said cone-shaped structure to create complete agitation of said liquid around said cone-shaped structure.

* * * * *